(12) United States Patent
Verger et al.

(10) Patent No.: US 8,011,698 B2
(45) Date of Patent: *Sep. 6, 2011

(54) SEALED TUBULAR JOINT WITH PLASTIC EXPANSION AND AT LEAST ONE INCLINED SURFACE

(75) Inventors: Eric Verger, Gommegnies (FR); Albert Bruneau, Velizy (FR); Antoine Durand, Antony (FR)

(73) Assignee: Vallourec Mannesmann Oil & Gas France, Aulnoye Aymeries (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/683,780

(22) Filed: Jan. 7, 2010

(65) Prior Publication Data

US 2010/0171310 A1    Jul. 8, 2010

Related U.S. Application Data

(63) Continuation of application No. 10/499,817, filed as application No. PCT/FR02/04546 on Dec. 24, 2002, now Pat. No. 7,699,361.

(30) Foreign Application Priority Data

Jan. 3, 2002 (FR) .................................. 02 00055
Mar. 27, 2002 (FR) .................................. 02 03842

(51) Int. Cl.
  *F16L 13/14* (2006.01)
  *F16L 15/00* (2006.01)
(52) U.S. Cl. ..................... 285/382.4; 285/333; 285/382; 285/382.2

(58) Field of Classification Search .................. 285/333, 285/334, 382, 382.1, 382.2, 382.4, 382.5, 285/390
See application file for complete search history.

(56) References Cited

U.S. PATENT DOCUMENTS

| | | |
|---|---|---|
| 3,489,437 A | 1/1970 | Duret |
| 3,870,351 A | 3/1975 | Matsuki |
| 4,494,777 A | 1/1985 | Duret |
| 4,611,838 A | 9/1986 | Heilmann et al. |
| 4,619,472 A | 10/1986 | Kozono et al. |
| 4,629,221 A | 12/1986 | Lumsden et al. |
| 5,681,059 A | 10/1997 | Mackie |
| 5,826,921 A | 10/1998 | Woolley |
| 5,924,745 A | 7/1999 | Campbell |
| 5,964,486 A | 10/1999 | Sinclair |
| 6,047,997 A | 4/2000 | Olivier |
| 6,322,110 B1 | 11/2001 | Banker et al. |
| 6,752,436 B1 | 6/2004 | Verdillon |
| 6,905,150 B2 | 6/2005 | Carcagno et al. |
| 6,971,685 B2 | 12/2005 | Hashem |
| 7,581,766 B2 | 9/2009 | Verge et al. |

(Continued)

FOREIGN PATENT DOCUMENTS

EP    0488912    6/1992

(Continued)

*Primary Examiner* — James M Hewitt
(74) *Attorney, Agent, or Firm* — Oblon, Spivak, McClelland, Maier & Neustadt, L.L.P.

(57) ABSTRACT

A tubular joint in which radial expansion caused by the passage of an expander, inclined shoulder fittings formed respectively on a peripheral surface of the female element facing radially inwards and on a peripheral surface of the male element facing radially outwards, are subjected to a relative axial displacement towards each other to be urged into sealed mutual contact with radial interference. The tubular joint is, for example, useful in hydrocarbon wells.

21 Claims, 9 Drawing Sheets

U.S. PATENT DOCUMENTS

| | | |
|---|---|---|
| 7,588,270 B2 | 9/2009 | Durand et al. |
| 7,699,361 B2 * | 4/2010 | Verger et al. ............... 285/382.4 |
| 2002/0163192 A1 | 11/2002 | Coulon et al. |
| 2003/0075924 A1 | 4/2003 | Olivier |
| 2003/0107213 A1 | 6/2003 | Baugh et al. |
| 2004/0262919 A1 | 12/2004 | Dutilleul et al. |
| 2005/0087983 A1 | 4/2005 | Verger et al. |
| 2005/0212290 A1 | 9/2005 | Durand et al. |
| 2005/0236834 A1 | 10/2005 | Curley et al. |
| 2006/0162145 A1 | 7/2006 | Verger et al. |
| 2007/0102927 A1 | 5/2007 | Dubedout et al. |
| 2007/0132236 A1 | 6/2007 | Dubedout et al. |
| 2007/0176422 A1 | 8/2007 | Dubedout et al. |
| 2007/0187951 A1 | 8/2007 | Roussie et al. |
| 2008/0007060 A1 | 1/2008 | Simpson et al. |

FOREIGN PATENT DOCUMENTS

| | | |
|---|---|---|
| FR | 1489013 | 11/1965 |
| FR | 2811056 | 1/2002 |
| GB | 2344606 | 6/2000 |
| GB | 2348657 | 10/2000 |
| WO | WO 93/25799 | 12/1993 |
| WO | WO 98/00626 | 1/1998 |
| WO | WO 98/42947 | 10/1998 |
| WO | 99/08034 | 2/1999 |
| WO | WO 99/06670 | 2/1999 |
| WO | WO 99/35368 | 7/1999 |
| WO | WO 00/08301 | 2/2000 |
| WO | WO 00/61915 | 10/2000 |
| WO | WO 02/01102 | 1/2002 |

* cited by examiner

SEALED TUBULAR JOINT WITH PLASTIC EXPANSION AND AT LEAST ONE INCLINED SURFACE

CROSS-REFERENCE TO RELATED APPLICATIONS

This application is a continuation application of U.S. application Ser. No. 10/499,817 filed Dec. 28, 2004, now U.S. Pat. No. 7,699,361, the entire contents of which are incorporated herein by reference. U.S. application Ser. No. 10/499,817 is the National Stage of PCT Application Number PCT/FR02/04546 filed Dec. 24, 2002, and claims priority to French Application No. 02/00055 filed Jan. 3, 2002, and French Application No. 02/03842 filed Mar. 27, 2002.

The invention relates to tubular joints, especially of the type used for hydrocarbon or similar wells, in geothermics for example.

Such a joint can exist between two tubes of considerable length, or between a tube of considerable length and a sleeve. These joints are used in particular to assemble columns of casing tubes ("casings") or production tubes ("tubings"). Considering the mechanical properties required, the casings and tubings are usually made from heat-treated steel.

The joints themselves must offer resistance to traction, compression, bending and sometimes twisting, and also to extreme differences in pressure in both directions between the inside and the outside. And they must even be impervious to gases, at least in certain circumstances. Threaded joints are particularly advantageous in this respect.

But it is currently intended to subject the tubes, in situ, to diametric expansion, with continuous plastic distortion. This offers various advantages, to which we shall return. Once again it is important for the joints to remain operational, following the plastic distortion by diametric expansion to which they are subjected as are the tubes. Also, it is desirable for the threaded joints to hold firm after plastic diametric expansion, retaining the bulk of the properties which give them their value, especially mechanical resistance under traction/compression, with or without excessive internal or external pressure, as well as tightness.

As will be seen in detail later, traditional joints do not offer complete satisfaction: either they do not meet these demands, or they meet them randomly, but not repeatedly.

WO 02/01102 proposes a joint structure intended to resist plastic diametric expansion.

The present invention will improve the situation.

The invention concerns a method for making a high performance sealed tubular joint, in which, from a first-state tubular joint consisting of
  a first male tubular element, comprising a first male threading and a ring shaped lip having a first axial abutting surface at the free end of the first element, and
  a second female tubular element, comprising a second female threading, corresponding to the first threading, and a housing, corresponding to the male lip, having a second axial abutting surface,
the first threading being screwed into the second threading to bring the two abutting surfaces into mutual contact,
and the first-state tubular joint is caused to undergo diametric expansion in terms of plastic distortion using an expansion ball of greater dimension than the internal diameter of said tubular elements, said expansion ball being displaced axially in the joint.

According to a principal feature of the invention, when said radial expansion occurs, a first inclined shoulder axially facing the direction opposite to said axial abutting surfaces and formed on the peripheral surface of the male lip radially facing outwards, and a first inclined shoulder axially facing towards said axial abutting surfaces and formed on the peripheral surface of the female housing facing radially inwards, undergo axial displacement relative to each other to come into sealed mutual contact with radial interference.

Here "sealed contact" means contact between two surfaces tightly pressed against each other in order to make a metal on metal seal.

Optional features of the invention, as additions or substitutes, are given hereunder:
  The peripheral surface of the housing facing radially inwards comprises ring shaped channel with a concave arc profile which presents a first flank facing axially towards said axial abutting surfaces and a second flank axially facing the direction opposite to said axial abutting surfaces, the first inclined shoulder of the housing being defined by said first flank.
  The profile of the channel has a radius of curvature between 5 and 30 mm, preferably close to 10 mm.
  The first inclined shoulders of the lip and the housing are present on the first tubular joint.
  The first inclined shoulders present on the first-state tubular joint are axially opposite each other on at least part of their radial height.
  The part of the lip between its first inclined shoulder and its axial abutting surface is at least partially impressed into the surface of the channel during expansion.
  The channel is connected on the side of the second axial abutting surface to a first part of peripheral wall and on the opposite side to a second part of peripheral wall which is smaller in diameter than the first part of peripheral wall.
  The difference between the diameters of said parts of peripheral wall is no greater than 1 mm.
  The first inclined shoulder of the lip is formed by it being at least partially impressed into the surface of the channel during expansion.
  The channel is adjacent to the second surface of the axial abutting surface.
  The channel is connected on the side of the second axial abutting surface to a first part of peripheral wall and on the opposite side to a second part of peripheral wall substantially of the same diameter as the first part of peripheral wall.
  The channel is connected on the side of the second axial abutting surface to a first part of peripheral wall and on the opposite side to a second part of peripheral wall which is greater in diameter than the first part of peripheral wall.
  The difference between the diameters of said parts of peripheral wall is no greater than 1 mm.
  The first part of peripheral wall of the housing has a smaller diameter than the surface opposite the male lip so that it causes radial interference between those surfaces when screwing is complete.
  The first inclined shoulder of the male lip and/or first inclined shoulder of the housing are coated with a material which is more ductile than the substrate material.
  Radial expansion of the joint is produced according to an expansion rate equal to at least 10%.
  Radial expansion of the joint is produced according to an expansion rate of about 15%.
  The peripheral surface of the housing radially facing inwards comprises a second inclined shoulder axially facing the direction opposite to the first inclined shoulder and together with it demarcating a rib.

The first and second inclined shoulders of the housing are connected to the top of the rib by roundings.

The rounding of the second inclined shoulder has a radius of curvature which is larger than the radius of curvature of the rounding of the first inclined shoulder.

The inclined shoulder of the male lip is connected by a convex rounding to the peripheral surface radially facing outwards.

Said shoulders are inclined at an angle between 5° and 20°, preferably close to 10°, in relation to the longitudinal axis of the joint.

Said shoulders present a radial height of between 0.2 and 1 mm, preferably close to 0.5 mm.

The first tubular element and the second tubular element belong respectively to a great-length tube and a sleeve intended to connect it to another great-length tube by means of a second tubular joint also obtained by the method according to the invention.

The first axial abutting surface is a projecting surface formed by a ring-shaped tongue and a transverse surface adjacent to the tongue and standing back axially in relation to it and connected to the internal peripheral surface of the first element and with the second axial abutting surface being a recessed abutting surface formed by a ring shaped groove and a transverse surface adjacent to the one connected to the internal peripheral surface of the second element, the tongue coinciding with the groove.

The first and second threadings are conical, their conicity being no greater than 12.5%.

The first and second threadings are cylindrical.

The thickness of the lip is between ⅓ and ⅔ of the thickness of the first tubular element.

The length and thickness of the lip are such that the ratio of length to thickness of the lip is between 1 and 4.

The first tubular element presents a groove, at the end of the first threading, between the threading and the lip.

The depth of the groove is no greater than the height of the threads of the first threading.

The length and depth of the groove are such that its length is between 2 and 15 times its depth.

The invention also relates to a first-state tubular joint usable for implementing the method as defined above, consisting of a first male tubular element, comprising a first male threading and a ring shaped lip having a first axial abutting surface at the free end of the first element, and a second female tubular element, comprising a second female threading, matching the first threading, and a housing, matching the male lip, having a second axial abutting surface, the first threading being suitable to be screwed into the second threading to bring the two abutting surfaces into mutual contact, and the peripheral surface of the housing facing radially inwards comprising a first inclined shoulder facing the second axial abutting surface.

The invention also relates to a high performance sealed tubular joint obtainable by means of the aforementioned method, consisting of a first male tubular element, comprising a first male threading and a ring-shaped lip having a first axial abutting surface at the free end of the first element, and a second female tubular element, comprising a second female threading, matching the first threading, and a housing, matching the male lip, having a second axial abutting surface, the first threading being screwed into the second threading, a first inclined shoulder axially facing the direction opposite to said axial abutting surfaces and formed on the peripheral surface of the male lip radially facing outwards, and a first inclined shoulder axially facing towards the said axial abutting surfaces and formed on the peripheral surface of the female housing radially facing inwards, being in sealed mutual contact with radial interference.

The figures below illustrate, non-exhaustively, the methods of producing the invention, the identical or similar elements being designated on all the figures by the same reference signs.

FIGS. 4 to 7 represent the threaded joint of FIG. 1 at various stages in the expansion process.

The drawings basically contain elements of a certain type. Therefore they may not only be used for a better understanding of the description, but also contribute to defining the invention, if necessary.

Reference is made here to the drilling of wells, for hydrocarbons or geothermics for example.

Traditionally, the top of a well is first of all drilled over a relatively small depth of some tens of meters using a tool with a wide diameter, in the order of 500 mm, for example, and is lined by means of a column of tubes of that diameter. The drilling diameter then decreases by steps to the bottom of the well which can be drilled with a much smaller diameter, in the order of 150 mm in the same example. Such a well is then lined by means of several columns of concentric tubes, each one sunk on completion of drilling at the corresponding diameter and all suspended from the surface; the tubes with the greatest diameter extend from the surface to some tens of meters in depth and the tubes with the smallest diameter extend from the surface to the bottom of the well, the depth of which can reach several thousands of meters. The space between the casings and the land is cemented, for example.

After the well is fully drilled and lined, a column of tubings can be sunk, in particular so that the hydrocarbons can be raised to the surface, i.e. actual operation of the well. It is understood that this column of tubings has an external diameter which is slightly less than the internal diameter of the column of casings.

Equipping a well therefore leads to a large number of tubes of different dimensions being used, most often assembled by means of threaded joints bearing in mind the advantages of this type of assembly. An attempt is made to make these tubes as slim as possible, so that casings with too great a diameters are not required near the surface. But adherence to the stresses and specifications applying to the threaded joints often leads to their being endowed with a thickness which is greater than that of the running portion of the tubes; which obliges the diametric progression between concentric columns to be increased, as one descends deep into the well.

The tubes are fitted together either by screwing the threaded ends of the tubes into each other (so-called integral joints), or using threaded sleeves fitting over their ends. The tubes are sunk successively after being screwed into the end of the tube or previous sleeve.

Specification API 5 CT of the American Petroleum Institute (API) also defines tubular threaded joints between two tubes of considerable length ("integral-joint tubing", "extreme-line casing") as well as sleeved threaded assemblies comprising two threaded joints enabling two great-length tubes to be assembled using a sleeve. These API joints are sealed only by the adding of lubricant loaded with metal particles which fills the interstices between the threads.

Of course the connections between tubes (or between tubes and sleeves) must remain tight whatever the stresses the tubes undergo when being sunk into the well, and in operation, and within a wide limit of supported mass, since each joint at least partially supports the tubes situated beneath it. So the mechanical performance of threaded joints seems closely linked to their geometric properties.

In the standard threaded joints according to API, despite the use of lubricants loaded with particles there is still an outlet in which a liquid at high pressure can circulate because of the play existing between the surfaces not in contact. For a given load under traction, there is a liquid pressure threshold beyond which the combined stress of traction and pressure initially causes a leak on the API threaded joints which can cause disengagement of the threading of the male and female parts in contact.

In order to avoid this, the threaded joints and assemblies have been the subject of various improvements: for example patents FR 1489013, EP 0488912, U.S. Pat. No. 4,494,777 have aimed to produce tubular threaded joints called superior or "premium", which are particularly tight due to metal-metal sealing surfaces radially interfering with each other and due to abutments between male and female elements carefully arranged so as to guarantee a given range of interference between those sealing surfaces.

As indicated, after sinking a tubular column into a well, it is expected to have it subjected to diametric expansion, with continuous plastic distortion. This is produced for example by means of an expansion ball being forced inside the column: see patents or patent applications WO 93/25799, WO 98/00626, WO 99/06670, WO 99/35368, WO 00/61915, GB 2344606, GB 2348657. This offers very interesting potentialities.

sinking a column of low spatial requirement, which is then expanded by force;
installing a column of casings in this way,
similarly, sealing in situ the holes in casings or tubings pierced by corrosion or the friction of drilling rods, or sinking tubes of low spatial requirement into the well which, once in place, are then expanded to the desired diameter.
finally and in particular, permitting the drilling of wells of uniform diameter over their entire length, in which the casing is produced by means of a column of tubes all of the same diameter, parts of columns being inserted in a non-expanded state, then being expanded in situ to the diameter of parts of expanded columns already in place and joined to them end-to-end.

It would then be possible to considerably decrease the number of tubes needed to equip a well, doing away with the tubes of greater diameter and greater thickness. As a result the cost of the well is reduced. It may even be envisaged that the well might be drilled directly with the column of casings, which would take on the role of boring rods.

It has turned out that producing threaded joints which retain their performance after expansion which may exceed 10%, or even reach 25%, is extremely delicate, all the more so as it must be reliable (all the joints must retain their strength) and stable under operating conditions.

Threaded assemblies resisting expansion are known via U.S. Pat. No. 5,924,745 and WO 98/42947. But these are a matter of assembling so-called EST (expandable slotting tubings) tubes, fitted with crossing lengthways slits, and subject to diametric expansion at the bottom of hydrocarbon walls (by inserting an expansion chuck into said tubes); widened, the slits permit a liquid outside the tube (hydrocarbon deriving from the deposit) to enter the tube to be raised to the surface. In this case, the tightness of the assemblies is clearly of no importance and, being at the bottom of the well, they do not take such a large mechanical load.

In fact, the first proposals for plastic expansion of sealed tubular columns are based on welded joints (bundles of tubes fitted end-to-end beforehand by welding, uncoiled from the surface) or on friction tubes ("slips"). But such joints do not have the performance of threaded joints, particularly with regard to the combination of mechanical strength, tightness under all operating conditions, and also the possibility of subsequently being dismantled/re-installed several times.

It has turned out that classic tubular threaded joints such as those according to patent U.S. Pat. No. 4,494,777 do not withstand plastic diametric expansion. After expansion on these joints the following is found:
a lack of tightness (which additionally prevents expansion by hydraulically pushing the expansion ball into the column from occurring);
deflection of the male end towards the inside of the joint which considerably and unacceptably reduces the operational internal diameter of the column by producing an internal projection into the space defined by the operational internal diameter.
possibly rupture of the lip of the male end by exceeding the distortion capacity of certain zones particularly under stress because of variations in thickness along the length of the male and female elements compared with the thickness of the body of the tube.

The production of a tubular threaded joint which may be able to resist the expansion operation in the well and which may be tight to liquids even, if possible, to gases after the said expansion operation, has therefore been sought. It has also been sought that the threaded joint should be simple and economical to produce. In addition it has been sought that the threaded joint should possess good metallurgical properties in operation hence after expansion, especially that when in such a state it should present sufficient yield strength, so that it is devoid of fragility and should present good crack-resistant properties under stress from H2S.

Threaded joints having a male lip corresponding to a female housing are known (U.S. Pat. Nos. 4,611,838, 3,870, 351, WO 99/08034, U.S. Pat. No. 6,047,997). It turns out that these known assemblies do not retain tightness after plastic expansion, which is furthermore in no way envisaged for them.

A method of producing a metal-on-metal tightness joint in the form of a finger adapted to that art is described in the aforementioned international application PCT/FR01/02005. However with this method, with the highest expansion rates it is found that the mechanical stresses sustained by the tubes when the expansion ball is inserted disengage the finger from its housing, causing insufficient tightness, even a complete lack of it, in the joints.

Figure 1:
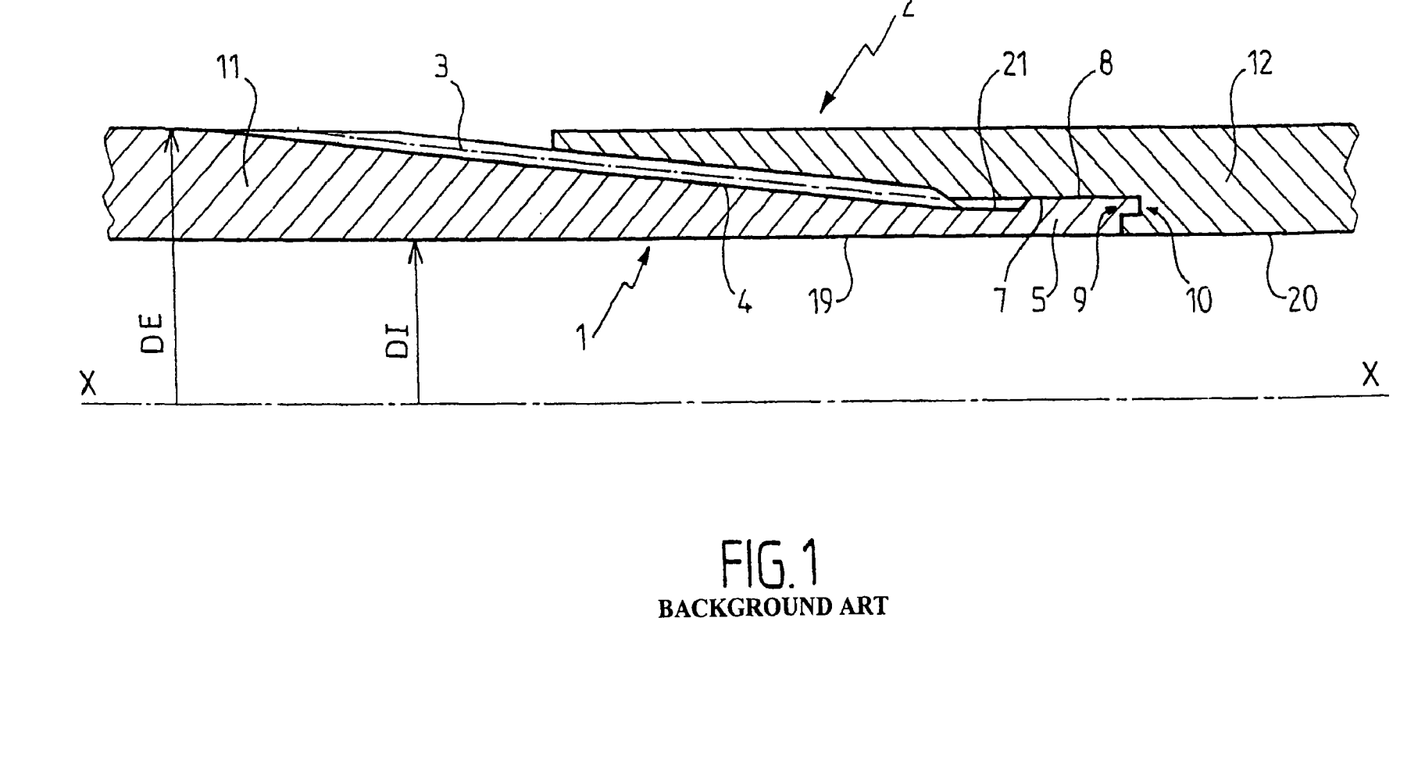
FIG. 1 represents a first-state threaded joint of the usual type to which the invention applies.

By way of explanation, FIG. 1 represents a joint according to application PCT/FR01/02005 published in No. WO 02/01102, not complying with the present invention, comprising a male threaded element 1 placed at the end of a first tube 11. Said male element is screwed to the end inside a female threaded element 2 placed at the end of a second tube 12. The interior diameter of the male threaded element is in this case equal to the interior diameter DI of the tubes 11, 12. In the method of embodiment under FIG. 1, the exterior diameter of the female threaded element is equal to the exterior diameter DE of tubes 11, 12, as an example only.

The joint is shown in FIG. 1 simply screwed to the end prior to any diametric expansion operation.

The second tube 12 as represented is a great-length tube. This second tube may, in a way which is not represented, be a sleeve furnished on one side with the female element 2 and on the other with a second female element which may or may not be symmetrical with the latter and screwed to a male element situated at the end of another tube of considerable length.

Figure 2:
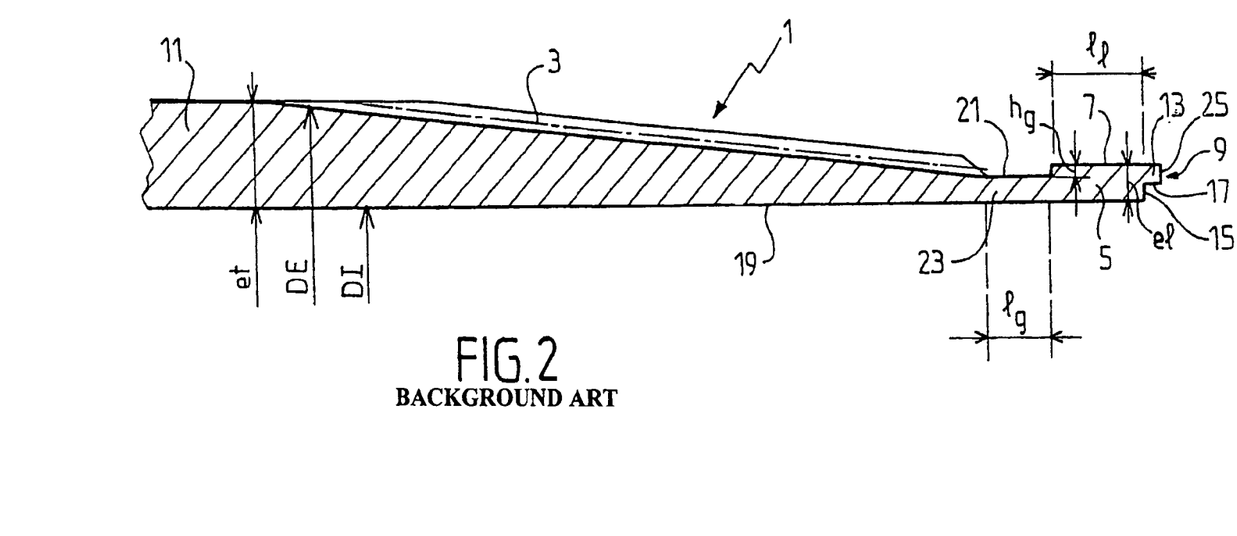
FIG. 2 represents the male element of the threaded joint of FIG. 1.

Only the male element 1 is represented in FIG. 2.

It includes a male threaded element 3, conical with trapezoidal threads, and is extended towards its free end by an unthreaded part formed by a groove 21 and by a lip 5 and terminates with a ring shaped surface at the male end 9.

The groove 21 is a shallow U shape.

It starts immediately beyond the threading and its depth $h_g$ is less than the height of the threads in the threading 3. Such that the bottom of the groove reaches the foot of the first thread of the threading.

The width of the groove $l_g$ is substantially equal to 4 times its depth $h_g$.

Lip 5 Presents:
a) an external peripheral surface 7, cylindrical in shape.
b) an internal peripheral surface 19 which corresponds to the area at the end of the cylindrical internal peripheral surface of the first tube 11.

Lip 5 therefore has an even thickness $e_1$, substantially equal to half the thickness $e_t$ of tube 11. It has a length $l_1$ measured from the end of the groove up to the extension of the surface 15 (defined below) substantially equal to 3 times the thickness of lip $e_1$.

The male end surface 9 forms a rebate. This rebate consists of a male ring shaped transverse surface 15 and a ring shaped tongue 13 projecting axially, adjacent to the transverse surface 15. The male transverse surface 15 is situated on the side of the rebate facing towards the interior of the threaded joint.

The external peripheral surface of the tongue 13 is within the extension of the surface 7 of the lip whereas its internal peripheral surface 17 is cylindrical, for example.

Figure 3:
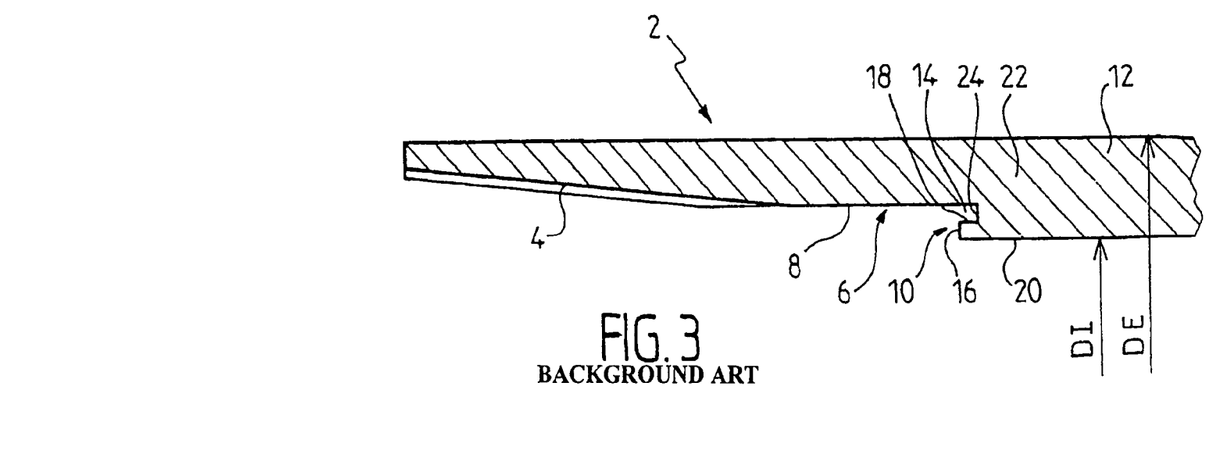
FIG. 3 represents the female element of the threaded joint of FIG. 1.

The radial thickness of the tongue 13 is substantially identical to that of the transverse surface 15 whereas the height of the tongue (or its axial projection) is markedly equal to the radial thickness of that same tongue. It may also be equal to 1.5 times that radial thickness so that it holds the free end of the tongue during expansion better, The female element 2 alone is represented in FIG. 3.

Starting from the free end of the female element, it consists of female threading 4 with trapezoidal threads matching the male threading 3 and then a non-threaded part 6. This non-threaded part 6 forms a housing to correspond and coincide with the lip 5 of the male element 1.

The female housing 6 presents a peripheral surface 8 facing towards the inside, cylindrical in shape, connected on one side to the female threading 4 and on the other via a female shoulder 10 to the cylindrical internal peripheral surface 20 of the second tube 12.

In general, the diameter of the peripheral surface 8 of the housing is very slightly larger in diameter than the external peripheral surface 7 of the male lip 5. In this way, the surfaces 7 and 8 can slide into each other with little clearance when screwing the male element into the female element, for example with clearance of 0.2 mm. The advantage of such sliding action will be explained further on.

The female shoulder presents a ring shaped shoulder surface 10 which is arranged in a substantially corresponding manner and is substantially similar in shape to that of the male end 9. The surface 10 forms a rebate comprising a female transverse ring shaped surface 16 and a ring shaped groove 14 adjacent to the transverse surface 16.

The female transverse surface 16 is situated on the side of the rebate facing towards the interior of the threaded joint.

The wall 18 of the groove 14 adjacent to the transverse surface 16 is cylindrical for example and can be connected to the latter by means of a chamfer or rounding. The opposite wall of the groove is in the extension of the peripheral surface 8. When screwing the threaded joint, the surface 17 of the tongue "rises" on the wall 18 of the groove until transverse free end 25 of the tongue reaches the bottom 24 of the groove 14. The axial height $h_r$ of the tongue 14 and the axial depth $p_r$ of the groove are such that the transverse surfaces 15 and 16 do not come into contact until further screwing has taken place. The slight clearance between the cylindrical surfaces 7 and 8 and between the surfaces of the tongue and the groove that extends them enable the lubricant to be removed after screwing has taken place and therefore correct positioning of the lip 5 in relation to the housing 6.

FIGS. 4 to 7 explain the distortion phenomena which occur when diametric expansion in the order of 15% is carried out using an expansion ball on tubes assembled by means of the threaded joints which have just been described and which enable a tight expanded joint to be eventually obtained.

Such distortion made on metal substances leads to plastic distortions in the metal.

Thus for example there is an increase from an external diameter of 139.7 mm (5.5 in.) on the second tube 12 upstream from the expansion and consequently in the part which is not yet distorted, to an external diameter of 157.5 mm (6.2 in.) on the first expanded tube 11 (facing or downstream from the outlet cone 33 of the expansion ball). Therefore a metal sustaining such a plastic distorsion has to be used for the tubes.

The plastic distortions generated increase the yield strength of the products: a tube originally having a yield strength of 310 Mpa (45 KSI) will thus have it increased to 380 MpA (55 KSI) after distortion.

Diametric expansion is produced in a known manner by means of an expansion ball 30 (FIG. 4) of suitable maximum diameter. This expansion ball is forced into the tubes either by pulling it using drilling rods or by pushing it for example by hydraulic pressure.

Figure 4:
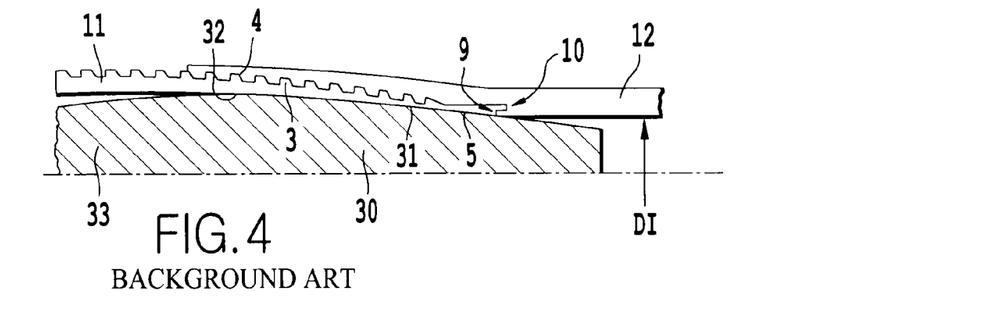
FIG. 4 represents the expansion phase of the threaded joint.

The expansion ball is for example biconic in shape with an inlet cone 31 on which the expansion takes place, a mid cylindrical part 32 and a conical outlet part 33.

All the surfaces of the parts of the expansion ball are connected to each other by appropriate connection radii.

In particular WO 93/25800 discloses entry cone angles specially suited to diametric expansion of so-called EST tubes for the operation of hydrocarbon wells.

As tubes 11, 12 have a substantially continuous section, their ends do not present any particular problem when inserting the expansion ball provided that the distortion capacity of the metal from which they are made is sufficient.

The problems to be solved derive from the fact that the threaded elements at the ends of the tubes are not as thick as those on the bodies of the tubes and vary in places, are more or less maintained and tend to distort differently between the male parts and the corresponding female parts.

If these differing distortions are overcome by using the threaded joint according to the invention, they enable a sealed threaded joint to be obtained after diametric expansion, not exhibiting any local redhibitory relief inside the internal peripheral surface of the tubes.

The process of expanding the threaded joint can be broken down into 4 phases which are the subject of FIGS. 4 to 7.

Although the expansion operation can be completely carried out in the opposite direction and lead to adequate results, the preferred method of distortion has been represented in which the expansion ball moves from the male element 1 of the first tube 11 towards the female element 2 of the second tube 12.

a) The Phase of Expansion on the Cone of the Expansion Ball

FIG. 4 shows the threaded joint during that phase.

Expansion is produced by the entry cone 31 of the expansion ball 30 and FIG. 4 shows the male (3) and female (4) threadings during diametric expansion.

On FIG. 4, the entry cone 31 of the expansion ball 30 starts the distortion of the male lip and the corresponding female housing zone by bending them in order to incline them in relation to the axis of the assembly.

During said expansion phase, the reactive loads to insertion of the expansion ball 30 are progressively transferred from the first tube 11 to the second tube 12.

Due to these reactive loads, the male lip 5 is axially compressed during said expansion phase by the ring shaped surface of the female shoulder 10.

Completion of the expansion phase corresponds to the free end of the male element reaching the end of the entry cone 31 of the expansion ball.

b) Bending Phase

Figure 5:
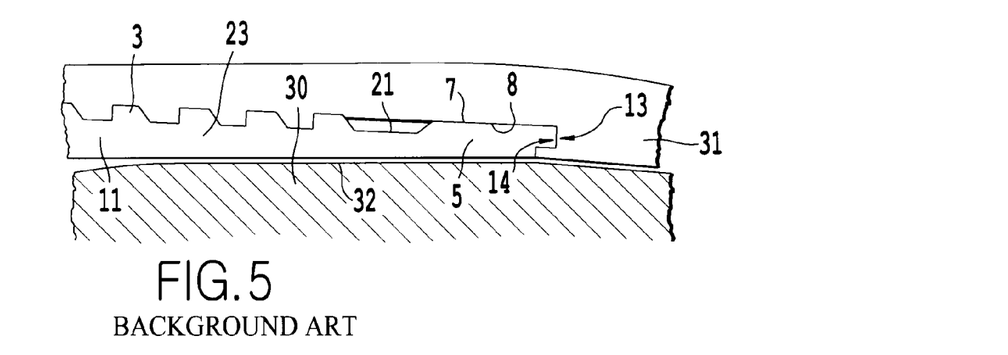
FIG. 5 represents the bending phase.

During this phase, the male lip is situated level with the central part 32 of the expansion ball: see FIG. 5.

i) Male Lip

The male lip 5 is subjected to bending moment in opposite directions on both its ends.

The surface of the male end 9 is in fact kept in position in the surface of the female shoulder 10 because of the rebates with supports 15, 16 and because of the system of capturing the tongue 13/groove 14.

Capture of the rebates obliges the zone of the free end of the male lip 5 to follow the inclination of zone 22 of the full thickness of the female element beyond the shoulder. This zone 22 is still in the course of expansion on the entry cone 31 of the expansion ball and therefore creates a bending moment at that level.

The other end of the lip, on the male threading side 3, is no longer supported and on the contrary subjects the lip to bending moment opposite to that at the free end of the lip.

The bending moments in opposite directions at the two ends of the male lip cause the banana shaped curve of the male lip 5 as in FIG. 5, the external peripheral surface 7 of the lip 5 adopting a convex bulging shape.

The state of axial compression of the male lip 5 on completion of the expansion phase, facilitates its curvature under the effect of the bending moments.

The groove 21 situated between the male lip 5 and the male threading 3 plays the role of a plastic pivot which accentuates the curvature of the male lip by limiting the width on which this curvature can take place.

However in this case care must be taken that the axial compression stresses on the male lip do not trigger buckling of the metal 23 beneath the groove. This buckling would result in projection of the metal beneath the groove in relation to the internal peripheral surface 19.

ii) Female Housing

The same bending phenomenon occurs on the female housing.

Zone 22 of full thickness and relatively rigid in comparison with the relatively thin zones of the lip, undergo additional expansion when passing through the mid section, such that the internal diameter of zone 22 becomes greater than that of mid zone 32 of the expansion ball. The additional expansion phenomenon is described in document WO 93/25800.

c) Straightening Phase

Figure 6:
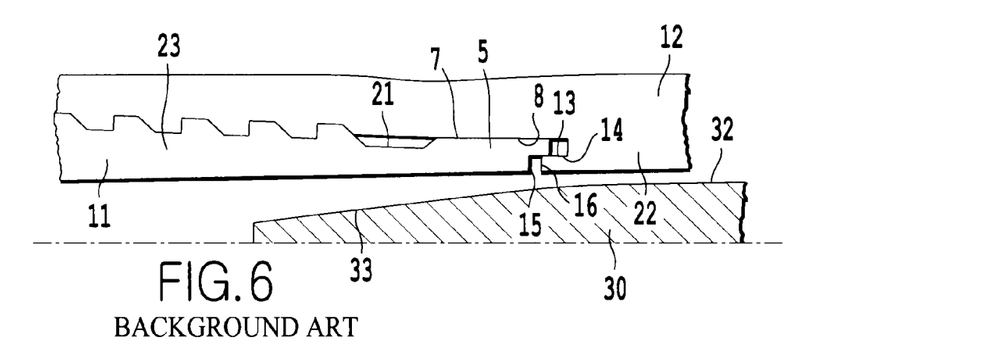
FIG. 6 represents the straightening phase.

This phase, illustrated by FIG. 6, corresponds to full female thickness zone 22 passing on to the mid section 22 of the expansion ball 30.

i) Female Housing

The bending generated in the previous phase tends to be reduced to zero under the effect of the tension and hoop stresses, which generates a state of axial stress due to inverse bending in relation to the curvature, thus producing the straightening.

This bending moment caused by these stresses is proportional to the thickness of the material upstream from the straightening. When reaching the full thickness of tube 12 (zone 22), the bending moment is not sufficient to straighten the internal peripheral zone of the female housing which then tends to dip towards the axis of the product. This behaviour results in a local reduction in the external diameter of the tube 12.

ii) Male Lip

As the female part straightens, the difference in axial bulk which was generated by the bending, decreases. The male lip 5 therefore progressively loses its state of compression. This continues with the separation of surfaces 15, 16 initially abutting. This phenomenon is reinforced by "the dive" of the internal peripheral surface 8 of the female housing which produces the effect of opening the abutting surfaces 15, 16.

The distortion into a banana curve imposed in the previous phase is retained.

d) Final State

Figure 7:
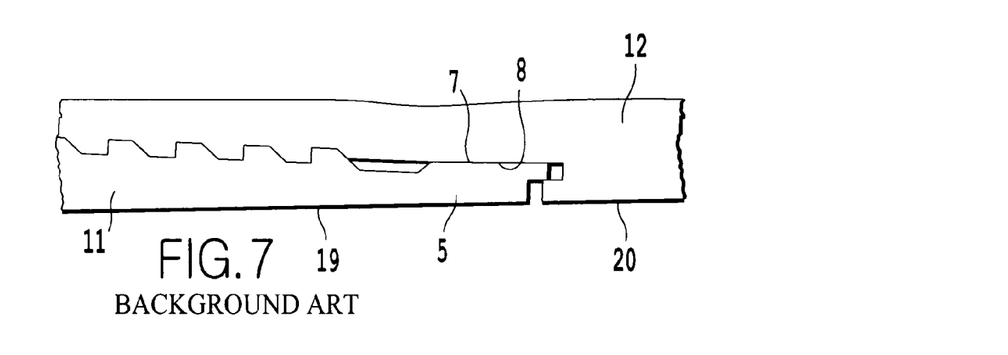
FIG. 7 represents the final state of the threaded joint after undergoing the expansion process.

FIG. 7 shows the final state of the threaded joint after insertion of the expansion ball.

The state of hoop stresses caused by the expansion leads to interference fit of the external peripheral surface 7 of the male lip by the internal surface 8 of the female housing. Self-interference fit of the surfaces 7, 8 of the threaded joint in expanded state might then be referred to, which enables tightness to be guaranteed. The male lip 5 does not dive towards the axis, as the radial offset imposed by the capture of the rebates 9, 10 has generated sufficient plastic distortions.

The elastic spring back of the elements of the threaded joint after insertion of the expansion ball is negligible in relation to the plastic distortions implemented.

Radial interference fit induces contact pressure of several tens of MPa, possibly more than 100 MPa, sufficient to guarantee tightness under internal or external pressure on the threaded joint. The length of the interference fit is sufficient over the entire periphery of the contact surfaces to guarantee stable tightness between them.

Tightness is furthermore necessary when expansion is produced by hydraulically thrusting the expansion ball 30 under 10 to 30 MPa pressure, any leak in the already expanded joints hindering any further penetration of the expansion ball into the column and therefore blocking the expansion process.

It will be noted that in its final state, it may very well occur that the tongue 13 no longer sits in the groove 14.

A male end surface 9 not captured in that female shoulder 10 causes that end to dip during the straightening phase which sees the transverse surfaces 15 and 16 initially abutting separate and an unacceptable projection of the lower end of the male lip inside the column then ensues. The column then no longer permits the equipment or tools to descend from a given spatial requirement.

Too great a clearance between peripheral surface 7 of the male lip 5 and peripheral surface 8 of the female housing on the threaded joint before expansion would not permit interference fit of these surfaces on completion of the expansion operation.

Radial interference between these surfaces in the original state before expansion is likely to hamper the differential distortions (curving, straightening) between these surfaces during expansion operations, these differential distortions permitting interference fit of these surfaces to take place on completion of the expansion operation. Thus it risks causing these surfaces to galling during screwing and wrong positioning of the elements with incorrect capture of surfaces 9 and 10 and thereby poor interference fit of surfaces 7 and 8 after expansion.

In a preferred method of embodiment, the form of ring shaped rebate with transverse surfaces 15, 16 and system of tongue 13/groove 14 enables the dipping of the male free end during expansion to be prevented. Other methods of producing embedded surfaces 9, 10 are possible in order to give the same result.

A very thin male lip 5, its thickness being less than one third of the thickness of the tubes 11, 12, does not enable an efficient abutment to be achieved on transverse surfaces 15, 16.

If the thickness $e_1$ of the male lip 5 is on the other hand greater than ⅔ of the thickness of the tubes 11, 12, the thickness of tube 12 in the area of the female housing leads to a critical section of female threading 4 being too weak and consequently insufficient resistance to traction of the threadings.

The length/thickness ratio of the male lip 5 governs behaviour under compression and bending of lip 5.

A male lip 5 of length $l_1$, less than its thickness, does not permit sufficient bending of the peripheral surface 7 of the male lip 5 and/or straightening of the peripheral surface 8 of the female housing.

A male lip 5 of length $l_1$ 4 times greater than its thickness $e_1$ can cause buckling of the male lip and internal projection thereof on the threading side.

This effect is accentuated by the presence of a groove 21 between male threading 3 and male lip 5.

This is why it is preferable for the groove to have a depth limited to a thread height and length limited in relation to its depth.

A tongue 13 of insufficient radial thickness and axial height less than the radial thickness could not be sufficiently maintained during expansion.

Figure 8:
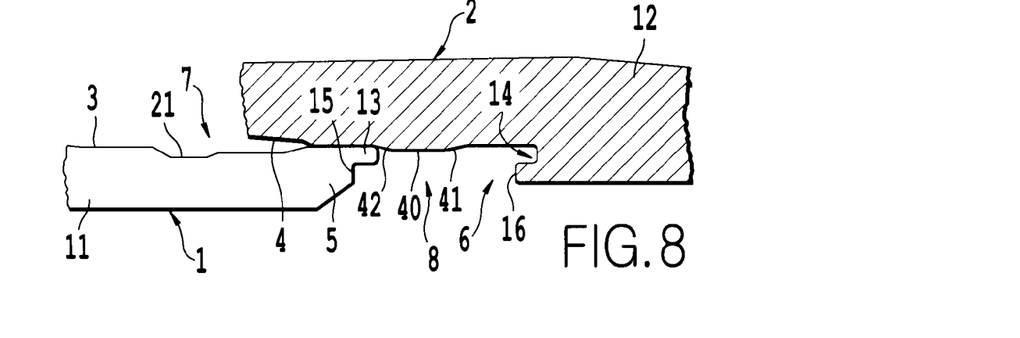
FIG. 8 represents a first phase of the screwing of a joint according to the invention, before expansion.

Reference should be made to FIG. 8 showing one of the two symmetrical parts of the axial section in an initial method of realising the joint according to the invention during the screwing phase.

FIG. 8 represents the joint comprising the male threaded element 1 comprising the male threading 3 placed at the end of the first tube 11. This male element is being screwed into the female threaded element 2 comprising the female threading 4 placed at the end of the second tube 12.

The ring shaped lip 5 presents the peripheral surface 7 radially facing outward. This peripheral surface 7 of the lip, starting from the male threading, comprises the groove 21 followed by a first cylindrical surface and then an inclined shoulder 43 and a second cylindrical surface. The first cylindrical surface has a smaller diameter than the second cylindrical surface.

The housing 6 presents a peripheral surface 8 radially facing inwards. This peripheral surface 8 of the housing, starting from the female threading, comprises a first inclined shoulder 42 followed by a second inclined shoulder 41 to form a rib 40 with a cylindrical top between the two inclined shoulders. The height of the rib is in the order of several tenths of a millimeter (for example, 0.4 mm).

FIGS. 8, 10, 12 and 14 present stages in the assembly of the joint as per the invention. FIGS. 9, 11, 13 and 15 illustrate the screwing torque associated with the assembly stages.

Figure 9:
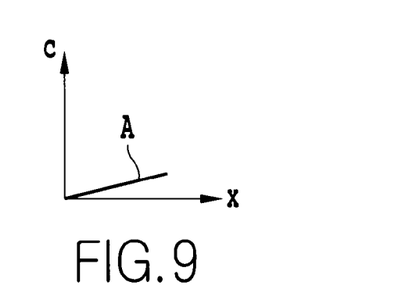
FIG. 9 represents a curve of the screwing torque at the time of the FIG. 8 phase.

Thus, FIG. 8 illustrates the first-state screwing phase for the joint according to the invention. The peripheral surface 7 of the lip is rotated against the peripheral surface 8 of the housing. FIG. 9 shows the linear development at low inclination of the screwing torque required for this screwing phase A.

Figure 10:
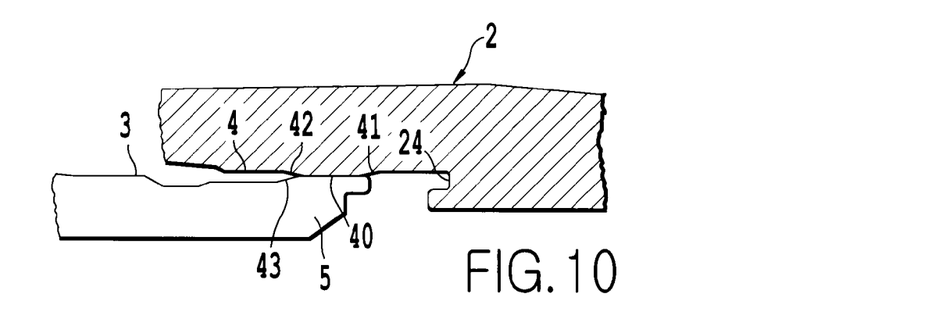
FIG. 10 represents a second phase of the screwing of the joint according to the invention before expansion.
Figure 11:
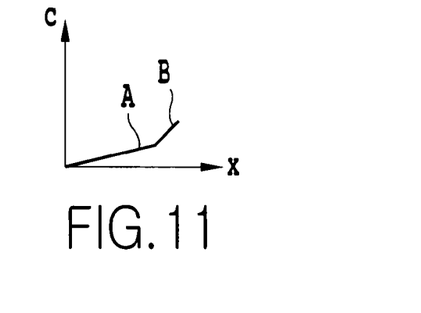
FIG. 11 represents a curve of the screwing torque as in FIG. 9 supplemented by the phase as in FIG. 10.

FIG. 10 illustrates passage of the rib 40 to the top via lip 5. Thus, during axial displacement of the male element 1, the inclined shoulder 42 partly forming the rib 40 on the female element forms an obstacle to the progress of axial displacement of the male element 1. Thus, the value of the screwing torque is increased so that lip 5 passes over the inclined shoulder 42. The lip is then subject to radial stresses which tend to compress it radially and elastically. This screwing phase is shown in FIG. 11: the inclination of the screwing torque increases in part B. The screwing torque then retains the same inclination as long as the top of the rib 40 is in contact with the second cylindrical surface.

Figure 12:
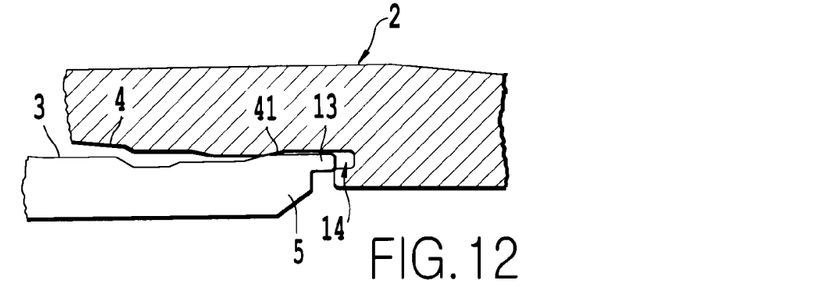
FIG. 12 represents a third phase of the screwing of the joint according to the invention before expansion.
Figure 13:
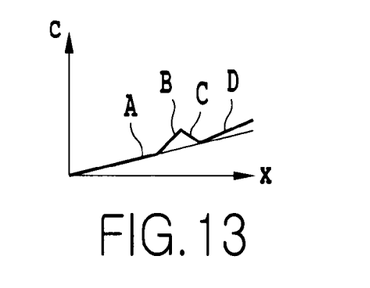
FIG. 13 represents a curve of the screwing torque as in FIG. 11 supplemented by the phase as in FIG. 12.

FIG. 12 illustrates completion of passage to the top of the rib 40 by the lip 5. Thus, when the inclined shoulder 43 of lip 5 reaches the level of the inclined shoulder 41 of the housing, the radial stresses decrease on lip 5 which then relaxes elastically. The screwing torque is then also greatly reduced. On FIG. 13, this phenomenon is expressed by a negative inclination of the screwing torque in part C. Then, the tongue 13 comes into contact with the upper surface of the groove 14 to lodge in the latter. The screwing torque then corresponds to the part D which presents an inclination of the screwing torque becoming positive again. This inclination is slightly greater than that in part A.

As the radial thickness of the tongue 13 is slightly less than that of the groove 14, the lower surfaces of them are not in mutual contact.

Figure 14:
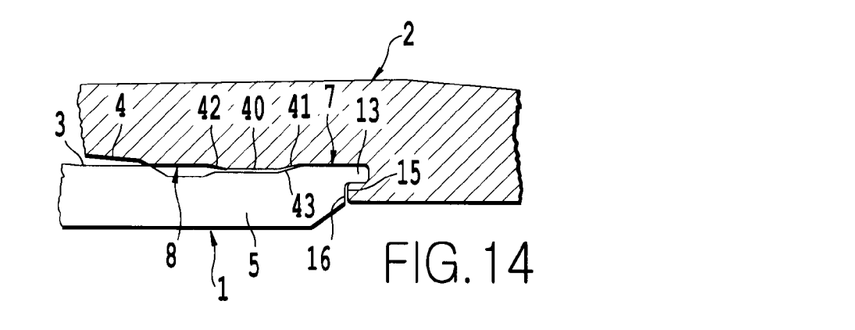
FIG. 14 represents a fourth phase of the screwing of the joint according to the invention before expansion.
Figure 15:
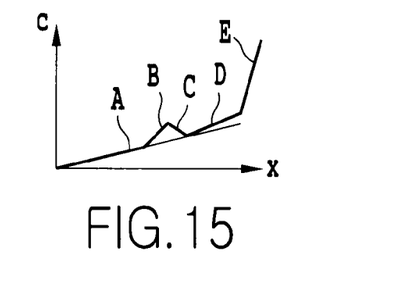
FIG. 15 represents a curve of the screwing torque as in FIG. 13 supplemented by the phase as in FIG. 14.

FIG. 14 illustrates completion of the insertion of tongue 13 into the groove 14. Thus, according to FIG. 14, tongue 13 has sufficient axial size for it to be able to come into axial abutment at the bottom 24 of the groove 14. FIG. 15 shows the screwing overtorque in part E corresponding to the contact pressure between tongue 13 and groove 14. In addition, a certain amount of tightness can be obtained at this stage between the upper peripheral surfaces of the tongue 13 and the groove 14.

In a different geometric embodiment of tongue 13, the latter does not have an axial size long enough to come into contact with the bottom of the groove 14. The screwing overtorque of FIG. 15 corresponds if the male ring shaped surface 15 comes into abutment against the female ring shaped surface 16.

In the screwing phases D and E, the inclined shoulders 41 of the housing and 43 of the lip are facing one another.

Advantageously, when assembling the joint, parts B and C enable it to be determined that the rib has been passed, indicating the last phase of screwing.

The surface of the male end 9 of the lip which forms a first axial abutting surface comprises the tongue 13 which has rounded ring shaped edges.

The surface of the female shoulder 10 of the housing which forms a second axial abutting surface comprises the groove 14 and the female transverse ring shaped surface 16, the ring shaped edge connecting the groove to the ring shaped surface 16 being rounded. This rounded edge coincides with the rounded internal edge of the tongue 13 during a screwing phase requiring the insertion of the tongue 13 into the groove 14 between stages C and D.

In like manner, the inclined shoulder 43 of the male lip is connected by roundings, going towards the end of the lip, to a part of the peripheral surface radially facing outwards. This ring shaped rounding has a radius of curvature in the order of a few millimeters (5 mm for example).

Preferably, the inclined shoulders 41 and 42 of the housing should demarcate the rib. The top of said rib comprises a cylindrical surface demarcated on each side by a rounding. The ring shaped rounding of each of the inclined shoulders 41 and 42 has a radius of curvature in the order of a few millimeter (5 mm and 9 mm respectively, for example).

These ring shaped roundings on the inclined shoulders 41 and 42 of the housing cooperate with the external rounded edge of the tongue 13 during the screwing phases B and C.

Thus, the ring shaped rounding of the inclined shoulder 42 of the housing means that the risk of galling when the tongue passes through can be reduced.

Figure 16:
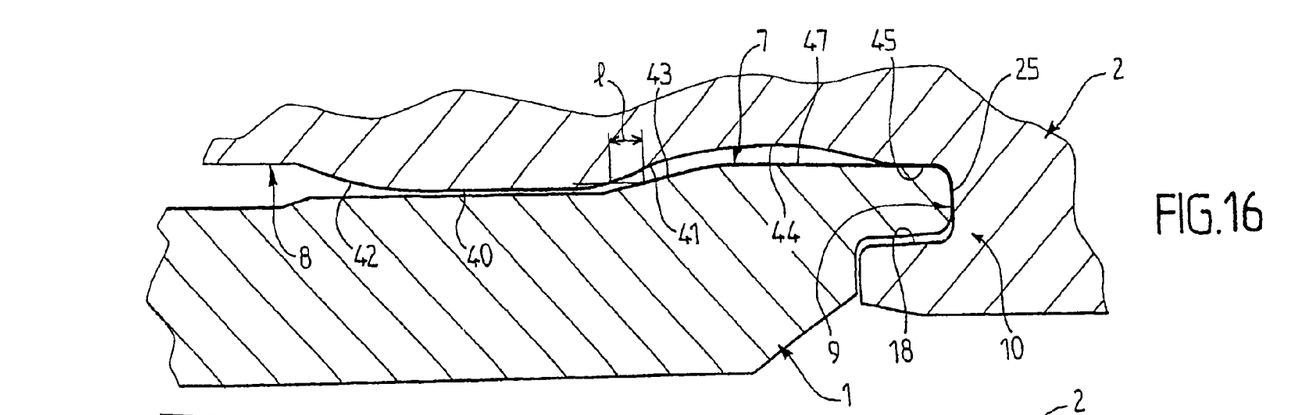
FIG. 16 is a view similar to FIG. 14, relating to a variant.

In the variant shown in FIG. 16, the peripheral surface 8 of the housing radially facing inwards comprises ring shaped channel 44 presenting a concave profile substantially in the form of an arc of a circle with a radius of about 10 mm, which is connected on the side of the second axial abutting surface 10 to a first part of the peripheral wall 45 and on the opposite side to a second part of the peripheral wall which constitutes the top of the rib 40, smaller in diameter than the part of the wall 45, the first inclined shoulder 41 defining the flank of the channel 44 at the side of the rib.

In this same variant, the peripheral surface 7 of the lip radially facing outwards comprises a cylindrical part 47 placed between the first inclined shoulder 43 and the first axial abutting surface 9. The space between the bottom of the channel 44 and the cylindrical part 47 and the clearances permit proper drainage of the lubricant during screwing.

During expansion of the joint, the concave shape of the channel 44 impresses a corresponding convex shape on the peripheral surface 7 of the lip, which has its maximum diameter thus augmented in relation to that obtained with the configuration in FIG. 14, so that the contact pressure of the sealing surfaces of the two elements is increased, leading to a more stable seal.

In an advantageous method of realising the invention, in the last phase of screwing the joint is suitable for expansion according to an expansion rate of between 10% and 25%, the preferred expansion rate being 15%.

In FIG. 16, the inclined shoulder 41 of the housing and the inclined shoulder 43 of the lip, are an axial distance of l apart. This axial distance l is a function of the expansion rate selected for the joint so that under radial distortion according to the expansion rate selected, the inclined shoulder 41 of the housing and the inclined shoulder 43 come into sealed contact with one another.

The radial expansion in fact leads to axial distortion causing displacement relative to the inclined shoulder 41 of the housing and to the inclined shoulder 43 of the lip. The axial direction of the expansion is immaterial, the contact between inclined shoulders 41 and 43 resulting either from the inclined shoulder 41 of the housing moving close to the inclined shoulder 43 of the lip, or vice versa, the inclined shoulder 43 of the lip moving close to the inclined shoulder 41 of the housing.

In the case of an expansion rate of 15%, axial distance l is a few millimeters (2 mm, for example).

Figure 17:
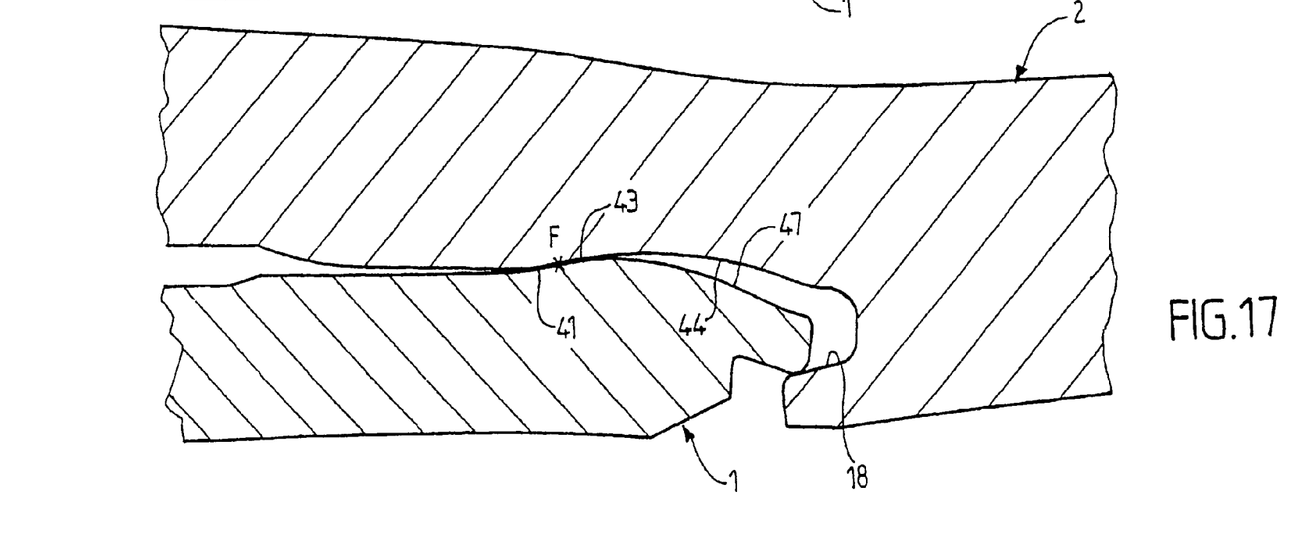
FIG. 17 is a similar view to FIG. 16, representing the joint after expansion according to the invention.

In FIG. 17, the joint is represented after expansion according to a chosen expansion rate, 15% for example, as previously described.

Thus, the radial distortions of the expansion have led to axial distortions of the lip 5 and the housing 6. The inclined shoulder 43 of the lip comes into contact at least in a point F with the inclined shoulder 41 of the housing, or vice versa. This sealed contact remains stable even under tension In the case of an expansion rate greater than the theoretical value chosen, the sealed contact is reinforced.

The channel impressed on the male lip has a greater local curvature which tends to favour contact between the tongue 13 and the flank 18 of the groove 14. This contact enables the behaviour of the lip to be locked in and stabilised under the pressure, especially internal, of a liquid.

Figure 18:
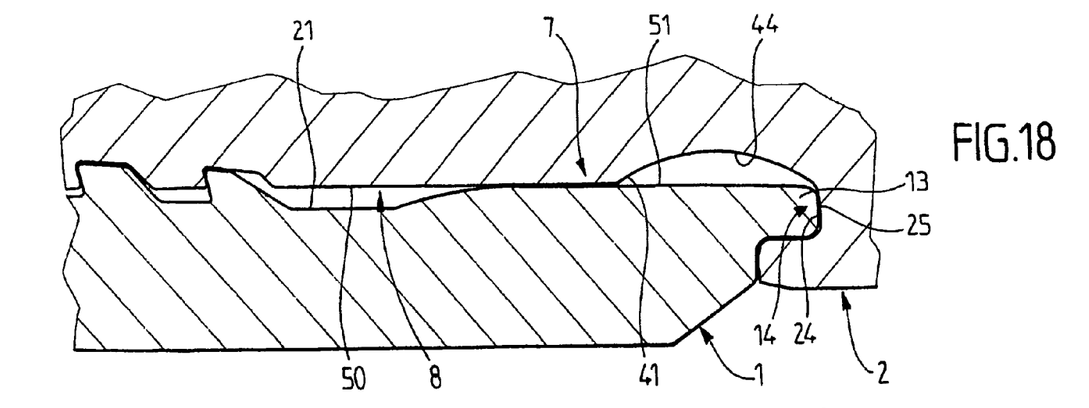
FIGS. 18 to 23 are similar views to FIGS. 16 and 17, relating to other variants, the even and odd numbered figures representing the original joints and the joints after expansion, respectively.

The female element 2 of the first-state tubular joint represented in FIG. 18 differs from that in FIG. 16 on the one hand by the removal of shoulder 42, and the rib 40 that it demarcated with the shoulder 41, on the other by removal of the part of peripheral wall 45. The peripheral surface 8 of the housing radially facing inwards is therefore made up of the channel 44, which connects directly to the bottom 24 of the groove 14, and of part of the cylindrical wall 50 which connects to the channel 44 facing the groove 14. The shoulder 43 of the male element 1 is also removed, so that the peripheral surface 7 of the lip radially facing outwards comprises part of the cylindrical surface 51 extending continuously from the groove 21 to the end 25 of the tongue 13. The cylindrical surfaces 50 and 51 are opposite each other, with slight clearance, in the region of the stretch of the joint between the groove 21 and the channel 44, which eliminates any risk of galling when screwing.

As an example, for a tubular joint of external diameter 193.7 mm (7.625 in.) the profile of the channel 44 can have a radius of curvature of 6.31 mm, a width of 6.76 mm and a depth in the order of a few tenths of a mm.

When the expansion ball is inserted, because of the radial stress sustained by the male lip, the part of the cylindrical surface 51 which is facing the channel 44 bulges to enter the free space demarcated thereby. Thus a shoulder 52 is formed on the peripheral surface 7, corresponding to the shoulder 41 defined by the flank of the channel 44. In the same way as the shoulders 41 and 43 in FIG. 17, the shoulders 41 and 52 in FIG. 19 move axially in relation to each other during expansion, with increasing axial locking leading to a sealed contact.

Figure 20:
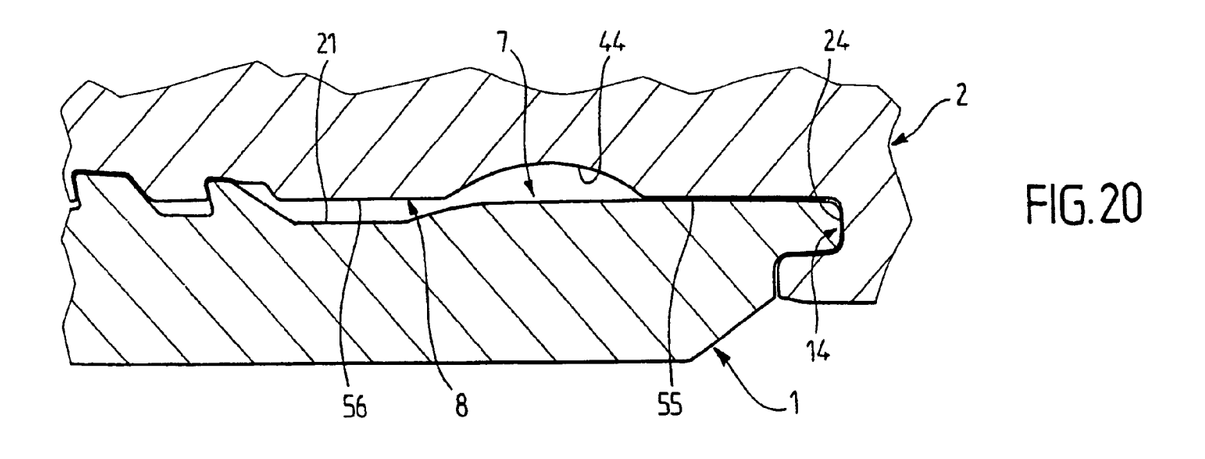

In the first-state tubular joint partially represented in FIG. 20, the male element 1 is identical to that in FIG. 18. However, the channel 44 of the female element 2 is axially shifted in relation to that of the female element in FIG. 18. Thus the peripheral surface 8 of the housing comprises, on either side of the channel 44 and connected to it, two sections of cylindrical surface of the same diameter, namely a first section 55 extending as far as the bottom 24 of the groove 14, and a second section 56 extending to opposite the groove. The section 55 is placed with a slight clearance opposite the cylindrical surface of the male lip, and the section 56 is situated opposite the groove 21. Thanks to this configuration, any risk of galling is eliminated during screwing.

The profile of the channel is for example identical to that described in respect of FIG. 18, its centre of curvature being at a distance from the bottom 24 of the groove equal to 9.38 mm, so that the edge of the channel opposite the groove is facing the part of the external cylindrical surface 51 of the male lip.

Figure 19:
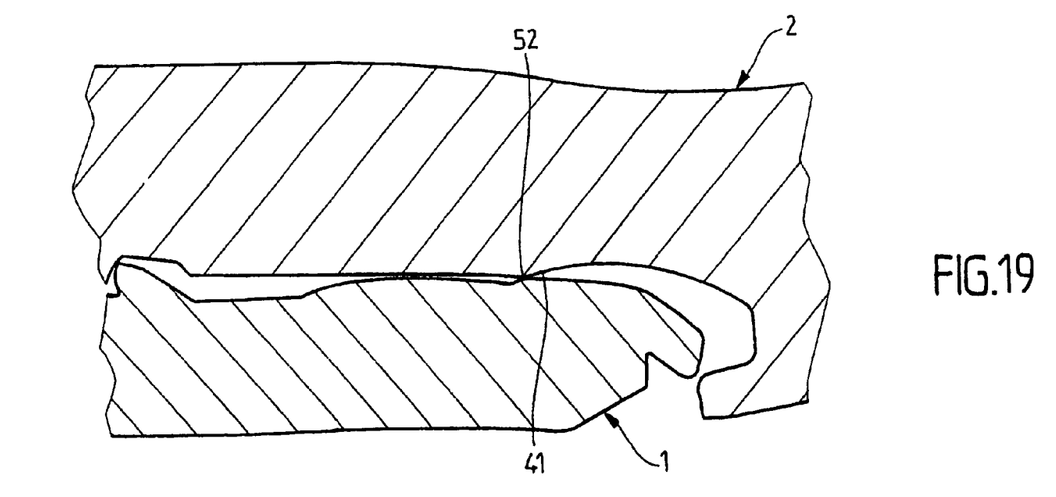
Figure 21:
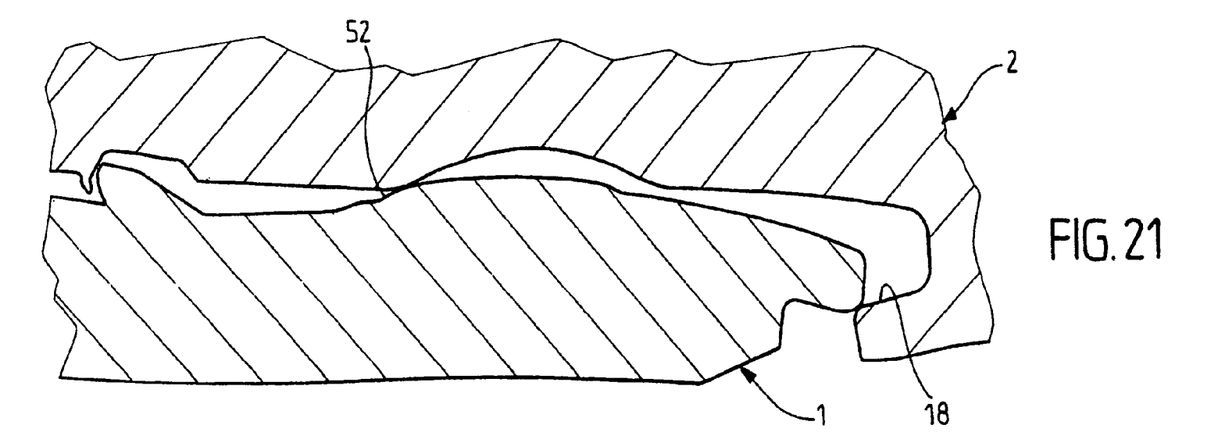

During radial expansion, a shoulder 52 is formed on the male shoulder in the manner described in respect of FIG. 19, this shoulder coinciding with the shoulder 41 in the manner described.

Figure 22:
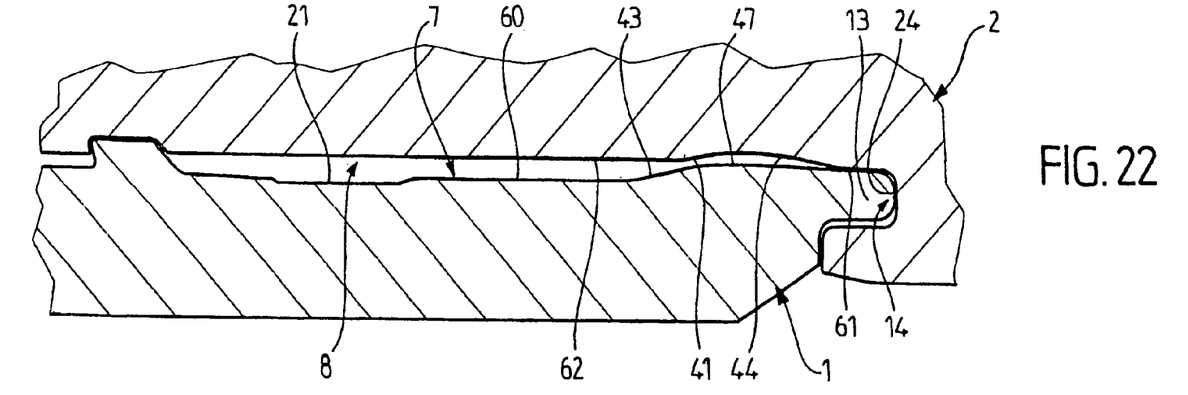

The male lip represented in FIG. 22 presents a profile which is similar to that of the lip illustrated in FIG. 16. Its peripheral surface 7 radially facing outwards therefore comprises, from the end 25 of the tongue 13, a first part of cylindrical wall 47 connected by an inclined shoulder 43 to a second part of cylindrical wall 60 of smaller diameter, itself succeeded by the groove 21. The profile of the housing for the female element in FIG. 22 is similar to that shown in FIG. 20, except that the diameter of the part of cylindrical wall 61 between the channel 44 and the bottom 24 of the groove 14 is smaller than that of the part of cylindrical surface 62 connected to the channel, as opposed to the groove 14. The diameter of the part of surface 61 is also slightly smaller than that of the part of the surface 47, producing radial interference with these surfaces when the joint is screwed.

However, the diameter of the part of surface 62 is greater than that of the part of surface 47, which eliminates the risks of these surfaces galling during screwing.

For example, for a first-state tubular joint with an external diameter of 152.4 mm (6 in.) the profile of the channel 44 can present a radius of curvature of 10.4 mm, centred at 3.7 mm from the end face 25 of the tongue 13, and an axial length of 4.9 mm, the maximum depth of the channel being 0.445 mm in relation to the part of the surface 61 and 0.19 mm in relation to the part of the surface 62, the difference in diameter between these two parts of surface therefore being 0.51 mm.

Figure 23:
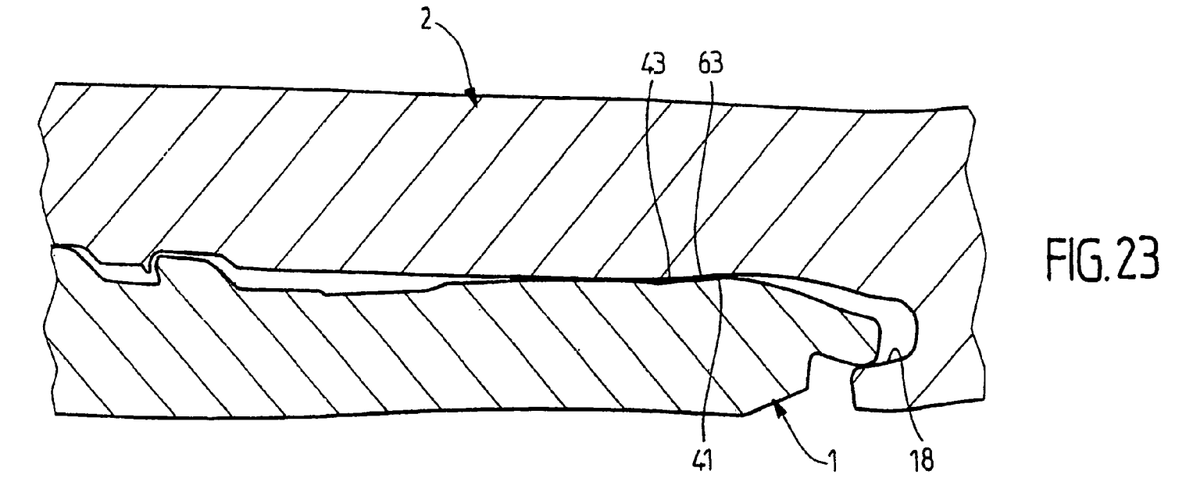

During radial expansion, alongside pre-existing shoulder 43, a shoulder 63 forms on zones 43 and 47 of the peripheral surface 7 of the male lip, as described in connection with FIG. 19, and coincides as described with shoulder 41.

The channel impresses greater local curvature on the male lip which tends to favour contact between the tongue 13 and the flank 18 of the groove 14. This contact enables the behaviour of the lip to be locked and stabilised under the pressure, especially internal pressure, of a liquid.

In the methods of embodiment in FIGS. 16, 18, 20 and 22, the depth of the channel is advantageously between 0.05 and 1 mm and preferably less than 0.5 mm, this depth being defined, when the channel is between two parts of the peripheral wall with different diameters, as the greatest radial height of its two flanks.

When manufacturing the first-state tubular joint, it can be an advantage to apply, on one and/or other of the surfaces intended to come into sealed mutual contact, a layer of ductile material as described in the patent application No. 0200053 of 3 Jan. 2002. This ductile layer enables the roughness of the metals used for the male element 1 and the female element 2, to be overcome. The contact zone after expansion is increased between the inclined shoulder of the lip and the inclined shoulder of the housing.

As it is known, to avoid asymmetry when producing threadings and consequently a reduction in the mechanical strength of the joints, due to the fact that the respective external and internal diameters of the tubes are not concentric when they leave the manufacturing process before threading, prior to the threading operation an expansion of the external diameter can be carried out from the free end of the female element and extending over all or part of the length of threading to be produced.

Similarly, it is possible to reduce the internal diameter close to the end of the male element by a contraction carried out before machining.

Expansion and contraction can be carried out with a constant diameter, or with an increasing diameter for the female element, decreasing for the male element, in the direction of the outer end.

What is claimed is:

1. An expandable tubular joint, comprising:
a first tubular male element, comprising a first male threading and a ring shaped lip having a first axial stop surface at a free end of the first element; and
a second tubular female element comprising a second female threading, matching the first threading, and a receiving element matching the male lip, having a second axial stop surface,
the first threading being configured to be screwed into the second threading to bring
the two stop surfaces into mutual contact, and a peripheral surface of the receiving element radially facing inwards, the female element comprising a first inclined shoulder facing towards the second axial stop surface, and a peripheral surface of the first tubular male element radially facing outwards and comprising a second inclined shoulder,
a peripheral surface of the receiving element radially facing inwards comprising a ring shaped channel with a concave arc profile that presents a first flank axially facing towards said axial stop surfaces and a second flank axially facing in an opposite direction to said axial stop surfaces,
the inclined shoulder fitting of the receiving element being defined by said first flank,
the concave channel impressing a corresponding convex shape on the peripheral surface of the male lip during expansion,
wherein, upon expansion of the joint, the inclined shoulders and said corresponding convex shape are at least locally in sealed mutual contact with radial interference.

2. An expandable tubular joint according to claim 1, specified to be expanded by axial insertion of an expander in either a first direction or a second direction.

3. An expandable tubular joint according to claim 1, wherein a profile of the channel has a radius of curvature between 5 and 30 mm.

4. An expandable tubular joint according to claim 1, wherein the depth of the channel is between 0.05 and 1 mm.

5. An expandable tubular joint according to claim 1, wherein the channel extends from a first part of a peripheral wall to a second part of the peripheral wall smaller in diameter than the first part of the peripheral wall.

6. An expandable tubular joint according to claim 5, wherein a difference between diameters of said first and second parts of the peripheral walls is no greater than 1 mm.

7. An expandable tubular joint according to claim 1, wherein the channel is adjacent to the second axial stop surface.

8. An expandable tubular joint according to claim 1, wherein the channel extends from a first part of a peripheral wall to a second part of the peripheral wall of a same diameter as the first part of the peripheral wall.

9. An expandable tubular joint according to claim 1, wherein the channel extends from a first part of a peripheral wall to a second part of the peripheral wall of greater diameter than the first part of the peripheral wall.

10. An expandable tubular joint according to claim 9, wherein a difference between diameters of said first and second parts of the peripheral wall is no greater than 1 mm.

11. An expandable tubular joint according to claim 9, wherein the first part of the peripheral wall of the receiving element has a smaller diameter than a surface opposite the male lip so that radial interference occurs between the first part of the peripheral wall of the receiving element and the male lip when screwing is complete.

12. An expandable tubular joint according to claim 1, wherein at least one of the inclined shoulders and the peripheral surface of the male lip are coated with a material that is more ductile than a material of a substrate.

13. An expandable tubular joint according to claim 1, wherein the shoulders present an angle of inclination between 5 and 20° in relation to a longitudinal axis of the tubular joint.

14. An expandable tubular joint according to claim 1, wherein the shoulders present a radial height between 0.2 and 1 mm.

15. An expandable tubular joint according to claim 1, wherein the first and second threadings are conical, their conicity being no greater than 12.5%.

16. An expandable tubular joint according to claim 1, wherein the first and second threadings are cylindrical.

17. An expandable tubular joint according to claim 1, wherein a thickness of the male lip is between ⅓ and ⅔ of a thickness of the first tubular element.

18. An expandable tubular joint according to claim 1, wherein a length and thickness of the male lip are such that a ratio of length to thickness of the male lip is between 1 and 4.

19. An expandable tubular joint according to claim 1, wherein the first tubular element has a throat at an end of the first threading, between the threading and the male lip.

20. An expandable tubular joint according to claim 19, wherein a depth of the throat is no greater than a height of threads in the first threading.

21. An expandable tubular joint according to claim 19, wherein a length and depth of the throat are such that its length is between 2 and 15 times its depth.

* * * * *